United States Patent Office 2,842,442
Patented July 8, 1958

2,842,442

PROCESS FOR MAKING YEAST LEAVENED BAKED PRODUCTS

George A. Jeffreys, Salem, Va.

No Drawing. Application December 1, 1954
Serial No. 472,516

6 Claims. (Cl. 99—90)

This invention relates to a new composition which greatly accelerates the leavening of yeast-leavened products such as bread and processes for making same.

Usual bread-making practice requires fermentation time of about 3 to 6 hours after mixing of the dough or sponge and before further processing such as dividing, overhead proofing, machining, panning and final or plan proofing. Processing after the initial fermentation generally requires about 2 hours so that the over-all time required before the dough is ready for the oven is generally in the neighborhood of about 5 to 7 hours.

Leavening and production of desired flavor and odor components in the baked product are due to enzymes produced by the yeast. Since, for the most part, yeast enzymes are intracellular, to take effect in the dough, the enzymes must be secreted extracellularly in sufficient quantity to produce the desired fermentation and other changes. With the usual small quantity of yeast incorporated in the dough, generally about 2% by weight of the flour, enzyme secretion in adequate quantities requires a considerable period of time, generally several hours. This explains the normally long initial fermentation period.

Various practices have been developed to reduce natural fermentation time but have hitherto been accompanied by certain disadvantages. According to one method, the amount of yeast employed has been increased from 2 to 5 fold. This produces a rapid gassing but results in an immature dough deficient in flavor and aroma. In another method, a liquid nutrient medium is fermented with yeast for about 3 to 5 hours and the fermented broth is incorporated into the dough. It is stated that the fermented broth eliminates or substantially reduces the initial fermentation period after dough formation. However, this method requires that each baker ferment a broth for 3 to 5 hours before embarking on the actual bread making procedure.

The object of this invention is to provide a leavening agent in dry, stable form which, when incorporated into yeast-leavened dough, reduces leavening time to a small fraction of the period normally required.

Another object is to provide a leavening agent which, while markedly accelerating leavening time, produces a baked product which is of superior quality in all respects, including texture, flavor and aroma.

Still another object is to provide a dry stable rapid-leavening powder which is readily available in any desired quantity without requiring preliminary processing by the user.

Other objects and advantages will become apparent from the following detailed description.

The leavening agent of my invention is a dry, stable product comprising cultured yeast together with substantial amounts of leavening enzymes and other bread-conditioning factors including flavor- and aroma-producing components. When the product is incorporated in a dough mix, it greatly reduces fermentation time. Time saving is generally in the neighborhood of 2 to 5 hours and is due to the presence of leavening and other conditioning enzymes and factors in amounts which normally require from 3 to 6 hours for production and secretion into the dough during ordinary yeast fermentation methods.

The leavening agent is produced by culturing yeast in a liquid medium containing nutrients of a character which promote production of the desired enzymes and other factors together with an extract of a culture of the mold *Aspergillus oryzae* grown on a substrate containing a cereal bran.

The principal nutrient components of the substrate employed to culture the yeast include sugar, namely sucrose, dextrose or a mixture of both, and an organic source of nitrogen such as amino acids, proteins, flour, milk or the like. Nitrogen containing inorganic salts, such as di-ammonium phosphate, ammonium chloride and ammonium sulfate, may also be used but should be employed as supplements to and not as substitutes for the organic nitrogen. Apparently the organic nitrogen compounds favor the production of desirable bread-conditioning factors. Flour is particularly suitable since, being a basic component of the bread dough, it stimulates formation in the yeast culture of an abundance of the desired bread-conditioning components.

It is also advisable to include in the yeast culturing medium some sodium chloride and monocalcium phosphate. These salts inhibit the growth of contaminating organisms and the latter also functions as a buffering agent.

Other inorganic salts which may be incorporated include, for example, di-potassium phosphate, mono-potassium phosphate, potassium bromate and the like. Although not essential, they exert a desirable influence in stimulating yeast growth and accelerating fermentation in the dough.

Many of the desirable inorganic salt supplements are present in organic nutrient materials such as flour, gluten, milk and milk products, vegetable and animal proteins and the like. Where such mineral-containing products are employed in the nutrient substrate, separate addition of inorganic salts may be reduced or omitted.

The concentration of sugar and other soluble nutrients in the liquid substrate should be at least 10% and preferably between 15 to 25% by weight. More dilute solutions favor the reproduction of yeast cells at the expense of enzyme production whereas the higher concentrations retard reproduction and induce the secretion of large amounts of enzymes into the culturing medium.

I have found that the addition to the yeast-culturing medium of an extract of a culture of *Aspergillus oryzae* grown on a substrate which consists, at least in part, of a cereal bran, preferably wheat bran, is essential to the production of the rapid-leavening agent having the leavening enzymes and other bread-conditioning factors of the desired kind and in the desired quantity. The mold culture extract contains enzymes and other conditioning factors which act on the carbohydrate and protein components both in the yeast-culturing medium and in the bread dough in such a manner as to render these nutrients more readily available to the yeast. The mold extract also apparently stimulates production by the yeast of leavening enzymes and other conditioning factors which promote the production of desirable flavor and aroma components essential to a high quality bread or other yeast-leavened baked product. The reducing properties of the yeast, which results in formation of compounds such as aldehydes, ketones, alcohols, esters, peptones and the like, which contribute to flavor, aroma, texture and digestibility of the baked product, are stimulated and accelerated by the mold extract.

It is desirable that the mold be grown on a substrate that contains, at least in part, a cereal bran. When *Aspergillus oryzae* is grown on a cereal bran and especially on wheat bran an enzyme or other factor is produced which conditions dextrose and dextrins in such a way that they become more readily and quickly fermentable by the yeast. This may be demonstrated by subjecting pure dextrose to the action of an aqueous extract of the mold culture and then comparing yeast activity on the treated dextrose with that on untreated dextrose. The treated dextrose is fermented much more rapidly. This is illustrated by the following test. Dextrose plus 0.25% of fungal extract was allowed to stand for 6 hours at 30° C. and then dried. Solutions of the dextrose so treated and solutions of an equal quantity of untreated dextrose were inoculated with equal amounts of yeast and kept at fermentation temperature. The treated dextrose fermented actively within 30 minutes whereas it required 3 hours for the untreated dextrose to reach the same degree of activity. Boiling the fungal extract destroys the dextrose-conditioning factor as indicated by the fact that dextrose treated as above with boiled fungal extract takes as long to ferment with yeast as the untreated dextrose.

The aqueous fungal extract should desirably be filtered to free it of organisms which would contaminate the yeast culture and have an adverse effect on the final product. High temperature treatment of the aqueous mold extract would effectively destroy the mold and other microorganisms but this is undesirable since important active principles such as the dextrose-conditioning agent would also be destroyed. Other methods of destroying viable organisms in the fungal extract which do not require high temperature treatment, such as ultra-violet irradiation, are acceptable.

The yeast culture may include, if desired, lactic acid organisms such as *S. lactis, B. bulgaricus* and the like. These may be added, for example, in the form of an active buttermilk culture.

In carrying out my invention, yeast is added to an aqueous medium containing sugar, which may be sucrose, dextrose or both, an organic nitrogen source, preferably wheat flour, inorganic salts as, for example, sodium chloride, monocalcium phosphate and such others as may be desired for their stimulating effect on the yeast action in the culture, and the filtered aqueous extract of a culture of *Aspergillus oryzae* grown on a substrate containing cereal bran, preferably wheat bran. Sufficient water should be introduced either in the form of the aqueous fungal extract or by separate addition to provide a liquid medium. The mixture, which should have a pH within the range of about 4.9 to 5.5, preferably about 5.2, is allowed to ferment at a temperature of about 25-37° C., preferably about 30 to 32° C., for about 3 to 6 hours.

The liquid culture may be dried as such by any suitable method as, for example, by spray drying or evaporation under vacuum. Because of the hygroscopicity of the dried culture, it is preferably mixed with a suitable solid absorbent carrier before drying. The culture is highly concentrated and active and, unless it is dispersed in a diluting solid, accurate measurement and uniform distribution in the dough mixture may be difficult. Any suitable absorbent carrier may be employed. However, it is desirable to use one, such as starch or flour, which is an essential component of the dough. The carrier also provides a means for incorporating salts, yeast foods, additional yeast, oxidizing agents and the like, which are normally or desirably included in the dough mix, thus eliminating or reducing the need for separate addition. After admixture of the liquid culture and the absorbent carrier, the mixture may be dried in any desired manner, as by spreading on drying trays or belts.

Where the yeast is to be maintained in viable state, which is generally preferable, the culture, either per se or in admixture with a carrier, should be dried at a maximum temperature of about 110° F. In any case, drying temperatures should not be permitted to rise above about 140° F. and preferably not above about 125° F. since higher temperatures tend to destroy or inactivate some of the enzymes and other conditioning factors.

The dried culture, which, if not already so, is desirably comminuted to a powder, is highly stable and may be stored for long periods without loss of activity. It is immediately available for use by the baker and may be employed in home baking or commercial baking on any scale.

The chief difference in the bread-making procedure when my new leavening agent is employed as compared with standard bread-making procedures lies in the considerable shortening to substantial elimination of the initial fermentation period. As compared with the sponge method, which requires two mixings, the first comprising partial addition of the ingredients followed by a long fermentation period and subsequent completion of ingredient addition followed by a floor rest period, only a single mixing of the ingredients is necessary when the rapid-leavening agent is incorporated. Standard equipment may be employed with my new rapid-leavening method.

Standard bread-making formulations may be used although certain components may be reduced or eliminated because of their presence in the rapid-leavening agent. The amount of sugar added, for example, may be reduced because of the presence of substantial quantities in the rapid-leavening composition. In general, it is desirable to add the standard amount of yeast, although it may be reduced somewhat if the yeast in the leavening agent is in viable condition. Salts normally employed in bread making may be reduced in quantity or eliminated if they have been incorporated in the leavening agent.

The rapid-leavening agent may be incorporated in the bread mix in any desired amount. The length of fermentation or floor rest time is determined by the concentration of the rapid-leavening agent in the dough mix. To a considerable extent, the quantity used depends on the concentration of active principles in the leavening product which, in turn, is determined by the proportion of absorbent carrier present. If the yeast culture has been dried per se without dilution in a solid carrier, a fraction of one percent as, for example, about 0.1 to 0.5% may be adequate. When a carrier has been employed, it is desirable to use proportionally more of the leavening agent. The leavening product made according to Example 1, for example, gives highly satisfactory results in amounts as small as ½% by weight of the flour in the dough mix. At percentages of about 3 to 4%, this product makes possible complete elimination of preliminary fermentation or resting time. Amounts above 4 to 5% may be employed but in general do not contribute any substantial increased advantage. With amounts of the carrier-based product as described in Example 1 comprising about 2% or less, some floor rest time is desirable, as, for example, about 15 to 20 minutes at 2% concentration. In any case, addition of my rapid-leavening agent in any amount will provide a substantial saving in fermentation and over-all bread-making time as compared with standard procedures.

After mixing of the dough and such floor rest time as may be necessary depending on the concentration of the rapid-leavening agent, the dough is processed according to standard procedures, namely the usual dividing, overhead proofing for the usual 10 to 20 minutes, machining and molding, pan proofing for the usual 60 to 80 minutes and baking. Overhead proofing and/or pan proofing time may be reduced somewhat if extra initial floor rest time has been given.

The over-all reduction in fermentation time, which is generally in the neighborhood of 2 to 5 hours, is made possible by the fact that the rapid-leavening agent contains, ready for immediate activity in the dough, the enzymes and other conditioning factors which usually require about 3 to 6 hours for normal production by the yeast introduced according to standard procedures into the dough mix. The mold extract present in the leavening agent also provides important enzymes and other factors which condition the dough, as, for example, the dextrose and other components, for accelerated assimilation by the yeast and also stimulate yeast activity and secretion. The rapid-leavening agent not only contains conditioning factors which favor production in the dough of the desired flavor- and aroma-imparting components but contains a substantial amount of such components.

Bread and other yeast-leavened baked products made with the rapid-leavening agent are of excellent quality in all respects. The baked products possess good volume, good oven spring, excellent bloom and crust color, even break and shred and superior flavor and aroma. They retain freshness and flavor for an unusually prolonged period. pH is uniform, being generally between 5.2 and 5.4.

The following examples illustrate typical embodiments of my invention, but it will be understood that they are in no way limiting.

*Example 1*

*Aspergillus oryzae* was cultured on wheat bran. The culture was extracted with water and the extract filtered free of microorganisms.

To 100 parts of the filtered mold extract, which contained 16% solubles, were added the following by weight:

4 parts dried active yeast
5 parts dextrose
2½ parts flour
2 parts wheat malt
0.4 part ammonium chloride
0.1 part potassium bromate
2.0 parts fructose or fruit syrup
1.0 part cultured buttermilk
0.1 part monocalcium phosphate
2.0 parts sodium chloride The ingredients were thoroughly mixed and allowed to ferment at 30–32° C. for five hours.

100 parts of the fermented liquid was then admixed with the following:

120 parts starch
40 parts flour
5 parts ammonium chloride
5 parts ammonium sulfate The resulting mixture was spread on trays and placed in a drying cabinet at 110° F. for four hours.

*Example 2*

A batch of bread was made according to the following formulation:

100 lbs. flour
2 lbs. sodium chloride
5 lbs. sugar
4 lbs. powdered milk
4 lbs. shortening
2 lbs. compressed yeast
¼ lb. yeast food
2 lbs. leavening product of Example 1
65 lbs. water The water at 85° F. was placed in the mixer. The yeast and rapid-leavening agent of Example 1 were dissolved in the water and mixed for about two minutes. The flour and remaining ingredients were added and mixed at slow speed for three minutes and then at high speed for eight minutes. Dough temperature was allowed to come to 87° F.

The dough was given a floor or rest time of twenty minutes at the end of which time it became sufficiently pliable to handle and machine. It was then run through the divider and given an intermediate or overhead proof of twelve minutes. At the end of this intermediate proof the dough was similar in its characteristics to a sponge raised dough.

The dough machined well in the molder and panner and was then given a final pan proof time of 65 minutes. The loaves, which possessed the desired firmness, were then baked.

The baked loaves showed better oven spring than average. Crust color was excellent and the break and shred was even. Grain, flavor and aroma were the equivalent of a high quality sponge-made bread.

Although this invention has been described with reference to illustrative embodiments thereof, it will be apparent to those skilled in the art that the principles of the invention may be embodied in other forms but within the scope of the invention and of the appended claims.

I claim:

1. In a process for making yeast-leavened baked products in which yeast is incorporated into a dough mix, the step which comprises adding to the dough mix, in addition to said yeast, a dry solid composition prepared by culturing yeast at a temperature of about 25–37° C. on a liquid substrate containing sugar, selected from the group consisting of sucrose and dextrose, organic nitrogen and an aqueous extract of a culture of *Aspergillus oryzae* grown on a substrate containing cereal bran, the yeast nutrients present in said liquid substrate comprising at least about 10% by weight of the culture medium, and then drying the fermented composition at a maximum temperature of about 140° F., said composition containing substantial amounts of leavening enzymes and other dough-conditioning factors and characterized by its ability to shorten substantially the fermentation time in the production of said yeast-leavened product.

2. In a process for making yeast-leavened baked products in which yeast is incorporated into a dough mix, the step which comprises adding to the dough mix, in addition to said yeast, a dry solid composition prepared by culturing yeast at a temperature of about 25–37° C. in a liquid substrate containing sugar, selected from the group consisting of sucrose and dextrose, organic nitrogen, sodium chloride, monocalcium phosphate and an aqueous extract of a culture of *Aspergillus oryzae* grown on a substrate containing wheat bran, said extract being free of viable microorganisms, the yeast nutrients present in the liquid substrate comprising at least about 10% by weight of the liquid substrate, pH of the liquid substrate being maintained within the range of about 4.9 to 5.5, continuing fermentation for at least about 3 hours and then drying the fermented composition at a maximum temperature of about 140° F., said composition containing substantial amounts of leavening enzymes and other dough-conditioning factors and characterized by its ability to shorten substantially the fermentation time in the production of said yeast-leavened product.

3. In a process for making yeast-leavened baked products in which yeast is incorporated into a dough mix, the step which comprises adding to the dough mix, in addition to said yeast, a dry solid composition prepared by culturing yeast at a temperature of about 25–37° C. in a liquid substrate containing sugar, selected from the group consisting of sucrose and dextrose, organic nitrogen, sodium chloride, monocalcium phosphate and an aqueous extract of a culture of *Aspergillus oryzae* grown on a substrate containing wheat bran, said extract being free of viable microorganisms, the yeast nutrients present in the liquid substrate comprising at least about 10% by weight of the liquid substrate, pH of the liquid substrate being maintained within the range of about 4.9 to 5.5, continuing fermentation for at least about 3 hours and then drying the fermented composition at a maximum temperature of about 110° F., said composition containing substantial amounts of leavening enzymes and other dough-conditioning factors and characterized by its ability to shorten substantially the fermentation time in the production of said yeast-leavened product.

4. In a process for making yeast-leavened baked products in which yeast is incorporated into a dough mix, the step which comprises adding to the dough mix, in addition to said yeast, a dry solid composition prepared by culturing yeast at a temperature of about 25-37° C. on a liquid substrate containing sugar, selected from the group consisting of sucrose and dextrose, organic nitrogen and an aqueous extract of a culture of *Aspergillus oryzae* grown on a substrate containing cereal bran, the yeast nutrients present in said liquid substrate comprising at least about 10% by weight of the culture medium, admixing the resulting liquid fermented composition with a solid carrier, and then drying the mixture at a maximum temperature of about 140° F., said composition containing substantial amounts of leavening enzymes and other dough-conditioning factors and characterized by its ability to shorten substantially the fermentation time in the production of said yeast-leavened product.

5. In a process for making yeast-leavened baked products in which yeast is incorporated into a dough mix, the step which comprises adding to the dough mix, in addition to said yeast, a dry solid composition prepared by culturing yeast at a temperature of about 25-37° C. in a liquid substrate containing sugar, selected from the group consisting of sucrose and dextrose, organic nitrogen, sodium chloride, monocalcium phosphate and an aqueous extract of a culture of *Aspergillus oryzae* grown on a substrate containing wheat bran, said extract being free of viable microorganisms, the yeast nutrients present in the liquid substrate comprising at least about 10% by weight of the liquid substrate, pH of the liquid substrate being maintained within the range of about 4.9 to 5.5, continuing fermentation for at least about 3 hours, admixing the resulting liquid fermented composition with a carrier containing starch, and then drying the mixture at a maximum temperature of about 140° F., said composition containing substantial amounts of leavening enzymes and other dough-conditioning factors and characterized by its ability to shorten substantially the fermentation time in the production of said yeast-leavened product.

6. In a process for making yeast-leavened baked products in which yeast is incorporated into a dough mix, the step which comprises adding to the dough mix, in addition to said yeast, a dry solid composition prepared by culturing yeast at a temperature of about 25-37° C. in a liquid substrate containing sugar, selected from the group consisting of sucrose and dextrose, organic nitrogen, sodium chloride, monocalcium phosphate and an aqueous extract of a culture of *Aspergillus oryzae* grown on a substrate containing wheat bran, said extract being free of viable microorganisms, the yeast nutrients present in the liquid substrate comprising at least about 10% by weight of the liquid substrate, pH of the liquid substrate being maintained within the range of about 4.9 to 5.5, admixing the resulting liquid fermented composition with a carrier containing starch, and then drying the mixture at a maximum temperature of about 110° F., said composition containing substantial amounts of leavening enzymes and other dough-conditioning factors and characterized by its ability to shorten substantially the fermentation time in the production of said yeast-leavened product.

References Cited in the file of this patent

UNITED STATES PATENTS

| | | |
|---|---|---|
| 621,796 | Collette et al. | Mar. 28, 1899 |
| 646,761 | Priest | Apr. 3, 1900 |
| 734,847 | Garrick | July 28, 1903 |
| 904,573 | Temple | Nov. 24, 1908 |
| 1,039,999 | Ohlhaver | Oct. 1, 1912 |
| 1,271,371 | Roush | July 2, 1918 |
| 1,391,562 | Miller | Sept. 20, 1921 |
| 1,677,529 | Pollak | July 17, 1928 |
| 1,731,400 | Takamine | Oct. 15, 1929 |
| 2,079,634 | Schultz | May 11, 1937 |

FOREIGN PATENTS

| | | |
|---|---|---|
| 1,115 of 1897 | Great Britain | Feb. 15, 1898 |
| 186,923 | Great Britain | June 14, 1923 |

OTHER REFERENCES

"The Chemistry and Technology of Enzymes," 1949, by H. Tauber, published by John Wiley and Sons, Inc. (New York), pages 401 to 405.

"Difco Manual," 9th edition, published by Difco Laboratories, Inc. (Detroit), page 251.